United States Patent
Hayashi et al.

(10) Patent No.: US 6,667,083 B2
(45) Date of Patent: Dec. 23, 2003

(54) MULTILAYER INJECTION BLOW MOLDED CONTAINER

(75) Inventors: Nahoto Hayashi, Pasadena, TX (US); William Scott Lambert, Pasadena, TX (US); Hiroshi Kawai, Kurashiki (JP); Kaoru Ikeda, Kurashiki (JP); Shinji Tai, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 56 days.

(21) Appl. No.: 09/851,083

(22) Filed: May 9, 2001

(65) Prior Publication Data

US 2003/0031817 A1 Feb. 13, 2003

(51) Int. Cl.⁷ .................... B29D 22/00; B29D 23/00; B32B 1/08; B32B 27/08; C08F 8/00
(52) U.S. Cl. ................. 428/35.7; 428/36.6; 428/36.7; 428/36.91; 428/515; 428/517; 428/519; 428/520; 525/191; 525/207; 525/214; 525/217; 525/221; 525/222; 525/232; 525/238; 525/239; 525/240; 525/241
(58) Field of Search ............... 428/35.7, 36.6, 428/36.7, 36.91, 515, 517, 519, 520; 525/191, 207, 214, 217, 221, 222, 232, 238, 239, 240, 241

(56) References Cited

U.S. PATENT DOCUMENTS

| 4,525,134 A | | 6/1985 | McHenry et al. ............ 425/130 |
| 4,568,261 A | | 2/1986 | McHenry et al. ............ 425/145 |
| 4,960,639 A | * | 10/1990 | Oda et al. .................. 428/34.5 |
| 5,221,566 A | * | 6/1993 | Tokoh et al. ............... 428/34.5 |
| 5,529,834 A | * | 6/1996 | Tsai et al. ................... 428/215 |
| 5,571,871 A | * | 11/1996 | Ikeda et al. ................. 525/337 |
| 6,033,749 A | * | 3/2000 | Hata et al. ................. 428/36.7 |
| 6,242,087 B1 | * | 6/2001 | Kawai ........................ 428/336 |
| 6,398,059 B1 | * | 6/2002 | Hayashi et al. ............. 220/562 |

FOREIGN PATENT DOCUMENTS

| EP | 0 186 154 | 7/1986 |
| JP | 55-139228 | 10/1980 |

* cited by examiner

Primary Examiner—Harold Pyon
Assistant Examiner—Catherine A. Simone
(74) Attorney, Agent, or Firm—Oblon, Spivak, McClelland, Maier & Neustadt, P.C.

(57) ABSTRACT

A multilayer injection blow molded container of this invention, containing a layer of a specific ethylene-vinyl alcohol copolymer (A) and a layer of a resin composition (B) comprising a thermoplastic resin (b1) having a specific functional group and polypropylene (b2), is disclosed, having characteristics that it has excellent gas-barrier properties, has good interlayer adhesion, has excellent thermal stability and can be produced with a low cost.

18 Claims, No Drawings

MULTILAYER INJECTION BLOW MOLDED CONTAINER

FIELD OF THE INVENTION

The present invention relates to a multilayer injection blow molded container having excellent gas-barrier properties, good interlayer adhesion and excellent thermal stability.

DESCRIPTION OF THE RELATED ART

Since ethylene-vinyl alcohol copolymers (hereinafter, referred to as EVOH) are excellent in transparency, barrier properties against oxygen, carbon dioxide and nitrogen and oil resistance, and also excellent in melt-molding properties, they are used as wrapping materials for foods, medicaments and the like while making the best use of these properties. In recent years, in order to make up for gas-barrier properties at higher humidity, impact resistance and the like, EVOH are frequently used while being laminated with other thermoplastic resin excellent in moisture-proof property and impact resistance. Also, in the field of hollow containers, a constitution is favored that contains a resin such as polyethylene, polypropylene, polyethylene terephthalate (PET), etc. in inner and outer layers and EVOH in an intermediate layer.

Containers of thermoplastic polyesters, typically PET, are used in many fields, since they are excellent in various properties including transparency, mechanical properties, flavor-barrier properties and the like, low in possibility of elution of residual monomers and harmful additives upon molding, and excellent in hygienic quality and safety. On the other hand, since polypropylene is inactive to blood, small in thermal shrinkage and is low in priced, polypropylene containers are attracting attention in medicament use and food use wherein contents are filled while hot, or so-called hot-filled.

Concerning the polypropylene containers, Japanese Patent Laid Open No. 139228/1980 discloses a technique for improving adhesion strength between a polypropylene layer and an EVOH layer by adding an adhesive resin made of a maleic anhydride-modified polypropylene or the like to the polypropylene layer. It has been known that, in this case, an alkali metal such as sodium, etc. contained in EVOH is effective for obtaining sufficient adhesion strength because it exhibits a catalytic effect.

SUMMARY OF THE INVENTION

An object of the invention is to provide a multilayer injection blow molded container that has excellent gas-barrier properties, has good interlayer adhesion, has excellent thermal stability and is low in production cost.

The above object can be attained by a multilayer injection blow molded container comprising a layer of an ethylene-vinyl alcohol copolymer (A) having an ethylene content of 5 to 60% by mol and a degree of saponification of 85% or more and a layer of a resin composition (B), characterized in that the resin composition (B) comprises 1 to 40% by weight of a thermoplastic resin (b1) having at least one functional group selected from the group consisting of boron-containing groups that are convertible to a boronic acid group in the presence of water and a boronic acid group (hereinafter, referred to as a boron-containing functional group), and 60 to 99% by weight of polypropylene (b2).

The invention also encompasses a process for producing a multilayer injection blow molded container, characterized by multilayer injection blow molding an ethylene-vinyl alcohol copolymer (A) having an ethylene content of 5 to 60% by mol and a degree of saponification of 85% or more and a resin composition (B) comprising 1 to 40% by weight of a thermoplastic resin (b1) having a boron-containing functional group and 60 to 99% by weight of polypropylene (b2), and subsequently stretch blow molding them.

DETAILED DESCRIPTION

The invention will be described below in detail.

It is necessary that the ethylene content in EVOH (A) used in the invention is 5 to 60% by mol. The ethylene content is suitably 15% by mol or more, and more suitably 25% by mol or more. In addition, the ethylene content is suitably 55% by mol or less, and more suitably 50% by mol or less. When the ethylene content is less than 5% by mol, the melt-molding properties are inferior. On the other hand, when it exceeds 60% by mol, the gas-barrier properties are insufficient.

It is necessary that the degree of saponification of EVOH (A) is 85% or more, suitably 90% or more, and most suitably 99% or more. When the degree of saponification is less than 85%, the gas-barrier properties and the thermal stability are insufficient.

EVOH (A) can be produced, for example, by a known process in which ethylene and a vinyl ester are copolymerized, followed by saponification. The vinyl ester includes vinyl acetate as a typical one, and vinyl esters of other aliphatic acids such as vinyl propionate, vinyl pivalate, etc. can also be used. In this case, a vinylsilane compound may be used as a component for copolymerization. Examples of the vinylsilane compound includes, vinyltrimethoxysilane, vinyltriethoxysilane, vinyltri(β-methoxy-ethoxy)silane, γ-methacryloxypropyl-methoxysilane, etc. Among them, vinyltrimethoxysilane and vinyltriethoxysilane are preferably used. The content of the vinylsilane compound is preferably within a range of 0.0002 to 0.2% by mol. In addition, other polymerizable monomers, for example, α-olefins such as propylene, 1-butene, etc.; unsaturated carboxylic acids or esters thereof such as (meth) acrylic acid, methyl (meth)acrylate, ethyl (meth)acrylate, etc.; vinylpyrrolidone compounds such as N-vinylpyrrolidone, etc.; can also be used as a component for copolymerization, so far as it does not adversely affect the object of the invention.

The alkali metal salt content in EVOH (A) is preferably 100 ppm or less, more preferably 70 ppm or less, and most preferably 50 ppm or less, converted to an alkali metal element. Japanese Patent Laid-Open No. 139228/1980 discloses a technique for improving adhesion strength between polypropylene layer and an EVOH layer by adding an adhesive resin made of maleic anhydride-modified polypropylene or the like to the polypropylene layer. It is described that, in this case, an alkali metal such as sodium, etc. contained in EVOH exhibits a catalytic effect, and therefore, the addition of an alkali metal salt is effective for obtaining sufficient adhesion strength. In the invention, it has been discovered that the sufficient adhesion strength between the polypropylene layer and the EVOH layer is maintained by using a thermoplastic resin (b1) having a boron-containing functional group even when the amount of the alkali metal salt is low. When the amount of the alkali metal is within the above-described range, phenomena such as occurrence of fish eye, streak, etc., lowering of tint and the like, attributed to cross-linking reaction between EVOHs during melting by heat, can be avoided. Particularly, the thermal stability of EVOH at or above 240° C. is improved.

Methods for adjusting the content of alkali metal salt in EVOH (A) within the above-described range are not particularly limited; since EVOH after saponification usually contains an alkali metal salt as a saponification catalyst residue, a method is preferred in which EVOH after saponification is washed to remove the alkali metal salt in accordance with a known method, and then, a prescribed amount of an alkali metal salt is added again. Methods for washing EVOH after saponification include a method in which chipped EVOH is added to a large amount of water, followed by stirring, a method in which shower water is sprayed, a method in which continuous washing is effected using a tower type washing apparatus, and so on. Methods for adding the alkali metal salt in EVOH include a method in which EVOH is soaked in a solution of an alkali metal salt, a method in which EVOH is melted and blended with an alkali metal salt, a method in which EVOH is dissolved in an appropriate solvent and mixed with an alkali metal salt, and so on.

When EVOH (A) is soaked in a solution of an alkali metal salt, the concentration of the alkali metal salt in the solution is not particularly limited. Although solvents for the solution are not limited, an aqueous solution is preferred for reasons concerning handling. The weight of the solution for soaking EVOH is usually 3 times or more, and preferably 20 times or more, the weight of dried EVOH. Although a suitable range for the soaking period varies depending on the form of EVOH, it is usually 1 hour or more, and preferably 2 hours or more, for chips of about 1 to 10 mm.

EVOH (A) may be blended with a boron compound. The boron compound herein includes boric acids, boric acid esters, boric acid salts, boron hydrides and the like. Specifically, the boric acids include orthoboric acid, metaboric acid, tetraboric acid and the like; the boric acid esters include triethyl borate, trimethyl borate and the like; and the boric acid salts include alkali metal salts and alkaline earth metal salts of the above-described boric acids, borax and the like. Of these compounds, orthoboric acid is preferred.

The boron compound content in EVOH (A) is preferably 20 to 2,000 ppm, and more preferably 50 to 1,000 ppm, converted to a boron element. By making the boron compound content within such range, EVOH having a reduced torque variation on heat melting can be obtained.

A suitable melt flow rate (MFR) (at 190° C. under a load of 2,160 g) of EVOH (A) is 0.1 to 50 g/10 min., more suitably 0.3 to 40 g/10 min., and most suitably 0.5 to 30 g/10 min. However, for those of a melting point around 190° C. or beyond 190° C., the value is represented by extrapolation at 190° C. in a semi-logarithmic graph, measuring MFR at plural temperatures above the melting point under a load of 2,160 g and plotting reciprocals of the temperatures on the abscissa and logarithms of MFR on the ordinate. These EVOH resins (A) can be used independently or can be used in a mixture of two or more.

In addition, so far as the object of the invention is not adversely affected, EVOH (A) can be blended with a thermal stabilizer, an ultraviolet absorber, an antioxidant, a coloring agent, other resins (polyamides, polyolefins, etc.) and a plasticizer such as glycerol, glycerol monostearate, etc. Especially, the addition of a metal salt of a higher aliphatic carboxylic acid and/or a hydrotalcite compound or the like is effective from a viewpoint for preventing thermal deterioration of EVOH (A).

The hydrotalcite compound herein can particularly include hydrotalcite compounds in the form of a double salt represented by $M_xAl_y(OH)_{2x+3y-2z}(A)_z \cdot aH_2O$ (wherein M is Mg, Ca or Zn; A is $CO_3$ or $HPO_4$; x, y, z and a are each a positive number). Particularly suitable compounds are exemplified by the following hydrotalcite compounds:

$Mg_6Al_2(OH)_{16}CO_3 \cdot 4H_2O$
$Mg_8Al_2(OH)_{20}CO_3 \cdot 5H_2O$
$Mg_5Al_2(OH)_{14}CO_3 \cdot 4H_2O$
$Mg_{10}Al_2(OH)_{22}(CO_3)_2 \cdot 4H_2O$
$Mg_6Al_2(OH)_{16}HPO_4 \cdot 4H_2O$
$Ca_6Al_2(OH)_{16}CO_3 \cdot 4H_2O$
$Zn_6Al_6(OH)_{16}CO_3 \cdot 4H_2O$
$Mg_{4.5}Al_2(OH)_{13}CO_3 \cdot 3.5H_2O$ In addition, compounds including a hydrotalcite-based solid solution $[Mg_{0.75} Zn_{0.25}]_{0.67} Al_{0.33}(OH)_2 (CO_3)_{0.167} \cdot 0.45H_2O$, described in Japanese Patent Laid-Open No. 308439/1989 (U.S. Pat. No. 4,954,557), can also be used as the hydrotalcite compound.

The metal salt of higher aliphatic carboxylic acid includes metal salts of a higher aliphatic carboxylic acid having 8 to 22 carbon atoms, for example, lauric acid, stearic acid, myristic acid and the like. The metal includes magnesium, calcium, zinc, barium, aluminum and the like. Among them, alkaline earth metals such as magnesium, calcium, barium and the like are suitable.

The content of the metal salt of higher aliphatic carboxylic acid or hydrotalcite compound is preferably 0.01 to 3 parts by weight, and more preferably 0.05 to 2.5 parts by weight, based on 100 parts by weight of EVOH (A).

EVOH (A) as described above is particularly excellent in thermal stability and causes almost no thermal deterioration when retained in an injection molding machine; therefore, it allows a continuous service for a long term.

The resin composition (B) used in the invention comprises 1 to 40% by weight of a thermoplastic resin (b1) having a boron-containing functional group and 60 to 99% by weight of polypropylene (b2). The boron-containing functional group contained in the thermoplastic resin (b1) refers to at least one functional group selected from the group consisting of boron-containing groups that are convertible to a boronic acid group in the presence of water and a boronic acid group. Of the boron-containing functional group, the boronic acid group is a group represented by the following formula (I):

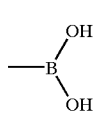

(I)

On the other hand, the boron-containing groups that are convertible to a boronic acid group in the presence of water refers to boron-containing groups that are convertible to a boronic acid group as represented by the above-described formula (I) upon hydrolysis in the presence of water. More specifically, they refer to functional groups that are convertible to a boronic acid group when hydrolyzed in a solvent of water alone, a mixture of water and an organic solvent (toluene, xylene, acetone, etc.), a mixture of a 5% aqueous boric acid solution and the organic solvent as described above or the like under conditions at room temperature to 150° C. for 10 minutes to 2 hours. Typical examples of such functional groups include boronic acid ester groups represented by the following formula (II), boronic anhydride groups represented by the following formula (III), boronic acid salt groups represented by the following formula (IV) and the like:

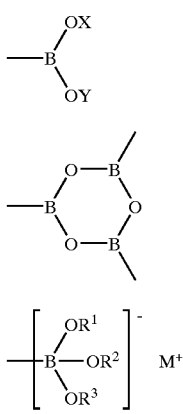

(II)

(III)

(IV)

{In the formulae, X and Y represent each a hydrogen atom, an aliphatic hydrocarbon group (a linear or branched alkyl group or alkenyl group having 1 to 20 carbon atoms, etc.), an alicyclic hydrocarbon group (a cycloalkyl group, a cycloalkenyl group, etc.) or an aromatic hydrocarbon group (a phenyl group, a biphenyl group, etc.), and X and Y may be the same or different, provided that the case where both X and Y are a hydrogen atom is excluded. In addition, X and Y may be bound. $R^1$, $R^2$ and $R^3$ represent each a hydrogen atom, an aliphatic hydrocarbon group, an alicyclic hydrocarbon group or an aromatic hydrocarbon group similar to the above-described X and Y, and $R^1$, $R^2$ and $R^3$ may be the same or different. In addition, M represents an alkali metal. Further, the above-described X, Y, $R^1$, $R^2$ and $R^3$ may have other group, for example, a hydroxyl group, a carboxyl group, a halogen atom, etc.}

Specific examples of the boronic acid ester groups represented by the general formula (II) include a dimethyl boronate group, a diethyl boronate group, a dipropyl boronate group, a diisopropyl boronate group, a dibutyl boronate group, a dihexyl boronate group, a dicyclohexyl boronate group, a boronic acid ethylene glycol ester group, a boronic acid propylene glycol ester group, a boronic acid 1,3-propanediol ester group, a boronic acid 1,3-butanediol ester group, a boronic acid neopentylglycol ester group, a boronic acid catechol ester group, a boronic acid glycerol ester group, a boronic acid trimethylolethane ester group, a boronic acid trimethylolpropane ester group, a boronic acid diethanolamine ester group and the like.

In addition, the boronic acid salt groups represented by the general formula (IV) include boronic acid alkali metal salt groups and the like. Specific groups include a boronic acid sodium salt group, a boronic acid potassium salt group and the like.

Of these boron-containing functional groups, boronic acid cyclic ester groups are preferred from the viewpoint of thermal stability. The boronic acid cyclic ester groups include, for example, boronic acid cyclic ester groups containing a 5-membered ring or a 6-membered ring. Specific groups include a boronic acid ethylene glycol ester group, a boronic acid propylene glycol ester group, a boronic acid 1,3-propanediol ester group, a boronic acid 1,3-butanediol ester group, a boronic acid glycerol ester group and the like.

The boron-containing functional group contained in the thermoplastic resin (b1) may be only one kind or two kinds or more. The amount of the boron-containing functional group is preferably 0.0001 to 0.002 equivalent per gram of the thermoplastic resin, i.e., 100 to 2,000 µeq/g, and more preferably 150 to 1,500 µeq/g.

Specific examples of the thermoplastic resin (b1) include polyolefin resins such as (ultra low-density, low-density, medium-density or high-density) polyethylene, an ethylene-vinyl acetate copolymer, an ethylene-acrylic acid ester copolymer, polypropylene, an ethylene-propylene copolymer, copolymers of ethylene with an α-olefin such as 1-butene, isobutene, 3-methylpentene, 1-hexene, 1-octene, etc., and so on; grafted modification products of the above-described polyolefins with maleic anhydride, glycidyl methacrylate or the like; styrene resins such as polystyrene, a styrene-acrylonitrile copolymer, etc.; styrene-hydrogenated diene block copolymer resins such as a styrene-hydrogenated butadiene block copolymer, a styrene-hydrogenated isoprene block copolymer, a styrene-hydrogenated butadiene-styrene block copolymer, a styrene-hydrogenated isoprene-styrene block copolymer, etc.; (meth)acrylic acid ester resins such as polymethyl acrylate, polyethyl acrylate, polymethyl methacrylate, etc.; halogenated vinyl resins such as polyvinyl chloride, vinylidene fluoride, etc.; semi-aromatic polyester resins such as polyethylene terephthalate, polybutylene terephthalate and the like; aliphatic polyester resins such as polyvalerolactone, polycaprolactone, polyethylene succinate, polybutylene succinate, etc., and so on. Only one of them may be used, and a mixture of two or more may also be used. Among them, polyolefin resins and styrene-hydrogenated diene block copolymer resins are preferred.

When the thermoplastic resin (b1) is a styrene-hydrogenated diene block copolymer resin, the weight ratio of a styrene unit to a hydrogenated diene unit contained in the copolymer resin is preferably 5/95 to 70/30, and more preferably 10/90 to 50/50.

Next, typical processes for producing the thermoplastic resin (b1) having a boron-containing functional group used in the invention are described.

First Process:

The thermoplastic resin (b1) having a boron-containing functional group is obtained by reacting a thermoplastic resin having an olefinic double bond with a borane complex and a trialkyl borate in a nitrogen atmosphere to give a thermoplastic resin having a boronic acid dialkyl ester group, followed by reacting the product with water or an alcohol, if necessary. In this manner, a boron-containing functional group is introduced into the olefinic double bond in the thermoplastic resin by the addition reaction.

The olefinic double bond is introduced into a terminal, for example, by the disproportionation when radical polymerization is terminated, or introduced into a backbone chain or a side chain by a side reaction during the polymerization. Particularly, the above-described polyolefin resins are preferred because an olefinic double bond can be easily introduced by thermal decomposition under an oxygen-free condition or copolymerization of a diene compound, and the styrene-hydrogenated diene block copolymer resins are preferred because the olefinic double bond can be remained in an appropriate degree by controlling the hydrogenation reaction.

The content of the double bond in the thermoplastic resin as a raw material is preferably 100 to 2,000 µeq/g and more preferably 200 to 1,000 µeq/g. By using such a raw material, the control of the amount of the boron-containing functional group to be introduced becomes easy. In addition, the control of the amount of the double bond remained after the introduction also becomes possible.

As the borane complex, preferred are a borane-tetrahydrofuran complex, a borane-dimethyl sulfide complex, a borane-pyridine complex, a borane-trimethylamine complex, a borane-triethylamine complex and the like. Among them, more preferred are a borane-dimethyl sulfide complex, a borane-trimethylamine complex and a borane-trimethylamine complex. The amount of the borane complex charged is preferably within a range of ⅓ equivalent to 10 equivalents based on the olefinic double bond in the thermoplastic resin.

As the trialkyl borate, preferred are lower alkyl borates such as trimethyl borate, triethyl borate, tripropyl borate, tributyl borate, etc. The amount of trialkyl borate charged is preferably within a range of 1 to 100 equivalents based on the olefinic double bond in the thermoplastic resin. Any solvent need not be particularly used; when it is used, saturated hydrocarbon solvents such as hexane, heptane, octane, decane, dodecane cyclohexane, ethylcyclohexane, decaline, etc. are preferred. The reaction room temperature is usually within a range of room temperature to 300° C., and preferably 100 to 250° C.; within this temperature range, the reaction is preferably carried out for 1 minute to 10 hours, and preferably 5 minutes to 5 hours.

The boronic acid dialkyl ester group introduced into the thermoplastic resin by the above-described reaction can be hydrolyzed to a boronic acid group according to a known process. In addition, it can be converted to any boronic acid ester group by ester exchange reaction with an alcohol again according to a known process. Moreover, it can be converted to a boronic anhydride group by subjecting to dehydration-condensation with heating. Still further, it can be converted to a boronic acid salt group by reacting with a metal hydroxide or a metal alcoholate according to a known process.

Such conversion of the boron-containing functional group is usually carried out with an organic solvent such as toluene, xylene, acetone, ethyl acetate, etc. The alcohol includes monohydric alcohols such as methanol, ethanol, butanol, etc.; polyhydric alcohols such as ethylene glycol, propylene glycol, 1,3-propanediol, 1,3-butanediol, neopentyl glycol, glycerol, trimethylolmethane, pentaerythritol, dipentaerythritol, etc.; and so on. In addition, the metal hydroxide includes hydroxides of an alkali metal such as sodium, potassium, etc. Moreover, the metal alcoholate includes those composed of the above-described metal and the above-described alcohol. These are not limited to the exemplified compounds. The amount of them is usually 1 to 100 equivalents based on the boronic acid dialkyl ester group.

Second Process:

The thermoplastic resin (b1) having a boron-containing functional group is obtained by amidating a known carboxyl group containing thermoplastic resin and an amino group-containing boronic acid or amino group-containing boronic acid ester such as m-aminophenylbenzeneboronic acid, m-aminophenylboronic acid ethylene glycol ester, etc. according to a known process. In this reaction, a condensing agent such as a carbodiimide may be used. The boron-containing functional group introduced into the thermoplastic resin in this manner can be converted to other boron-containing functional group according to the method described above.

The carboxyl group containing thermoplastic resin includes, but is not limited to, resins having a carboxyl group at a terminal of a semi-aromatic polyester resin or an aliphatic polyester resin; resins formed by introducing a carboxyl group-containing monomer unit such as acrylic acid, methacrylic acid, maleic anhydride, etc. into a polyolefin resin, a styrene resin, a (meth)acrylate resin, a halogenated vinyl resin, etc. by copolymerization; resins formed by introducing a maleic anhydride, etc. into a thermoplastic resin having an olefinic double bond as described above by addition reaction; and others.

As the polypropylene (b2) constituting the resin composition (B) can be used random or block copolymers with other olefin compound such as ethylene or the like, in addition to homopolypropylene. Among them, copolymers with ethylene are preferred from the viewpoints of transparency and outer appearance of molded products. In addition, the melt index of the polypropylene (b2) is preferably 0.1 to 100 g/10 min. (at 230° C. under a load of 2,160 g), more preferably 0.2 to 50 g/10 min., and most preferably 0.5 to 20 g/10 min.

In the resin composition (B), it is necessary that the amount of the thermoplastic resin (b1) having a boron-containing functional group added is 1 to 40% by weight, preferably 5 to 35% by weight, and more preferably 10 to 30% by weight. When the amount is less than 1% by weight, there is a possibility that the effect for improving the interlayer adhesion between the EVOH (A) layer and the resin composition (B) layer is insufficient, and as the result, the interlayer adhesion strength of the obtained container may be reduced. When the amount exceeds 40% by weight, there is a possibility that the cost for producing containers increases.

In addition, in the resin composition (B), the amount of polypropylene (b2) added is 60 to 99% by weight, preferably 65 to 95% by weight, and more preferably 70 to 90% by weight.

The resin composition (B) can easily be obtained by melt-kneading the thermoplastic resin (b1) having a boron-containing functional group and the polypropylene (b2) using a usual melt-kneading apparatus such as a single-screw or twin-screw extruder, etc. The melt-kneading apparatus is not particularly limited, and it is preferred to use an extruder having a high kneading degree in order to attain uniform blending. In addition, it is preferred to seal a hopper inlet with nitrogen gas and carry out the extrusion at a low temperature in order to prevent occurrence or mingling of gel or hard spot. In this operation, so far as the object of the invention is not adversely affected, an antioxidant, a plasticizer, a thermal stabilizer, an ultraviolet absorber, an antistatic, a lubricant, a coloring agent, a filler and other resins may be added.

Because the adhesion between polypropylene and EVOH is low, when polypropylene and EVOH are laminated without using an adhesive layer for cost-reduction object, pealing-off may occur during usage; by using the above-described resin composition (B) in place of the polypropylene, the pealing-off problem during usage is avoided.

The multilayer injection blow molded container of the invention has a layer of EVOH (A) and a layer of the resin composition (B) as the essential components. So far as the object of the invention is not adversely affected, the layer of the resin composition (B) may be composed of plural layers and may have a layer of a resin composition comprising a blend of the resin composition (B) and EVOH (A) (such as a recovery layer); but it is preferable that the layer constitution comprises exclusively the layer of EVOH (A) and the layer of the resin composition (B), and it is more preferable that the layer constitution comprises the layer of the resin composition (B) on both sides of the layer of EVOH (A). Specifically, when the layer of EVOH (A) is designated as A, and the layer of the composition (B) is designated as B, examples of the suitable layer constitution include (outer) B/A/B(inner), (outer)B/A/B/A/B(inner) and the like. In the above description, (inner) indicates the inner layer, i.e., a layer that will contact with the content.

The multilayer injection blow molded container of the invention is produced by stretch blow molding a precursor of the container (multilayer parison) obtained by multilayer injection molding. In the multilayer injection molding, the molding is performed by injecting resins for constituting the respective layers from respective injection cylinders into concentric nozzles simultaneously or alternately in staggered times.

In the invention, the multilayer parison is produced, for example, (1) by a process in which layers of the resin composition (B) for inner and outer layers are first injected, and then, EVOH (A) for the intermediate layer is injected to give a molded container having a three-layer constitution of B/A/B; (2) by a process in which layers of the resin composition (B) for inner and outer layers are first injected, then EVOH (A) is injected, and simultaneously or thereafter, layers of the resin composition (B) are injected again to give a molded container having a five-layer constitution of B/A/B/A/B; and so on; the process is not limited thereto. It is preferred that the process includes a step of carrying out a single mold closing operation on a single mold using a molding machine having two or more injection cylinders.

As to conditions for injection molding, the resin composition (B) is injection molded at a temperature preferably within a range of 180 to 250° C., and more preferably 200 to 250° C., from the viewpoint of fluidity of the resin composition (B) on melting as well as outer appearance and strength of the obtained container. In addition, the EVOH (A) is injection molded at a temperature preferably within a range of 170 to 280° C., more preferably 180 to 260° C., and most preferably 190 to 240° C., from the viewpoint of fluidity and thermal stability of EVOH (A) on melting as well as outer appearance and gas-barrier properties of the obtained container. Furthermore, the temperature of the mold is preferably within a range of 0 to 70° C., more preferably 5 to 50° C., and most preferably 10 to 30° C., from the viewpoint of prevention of crystallization in each layer component, molding performance on molding and outer appearance of the obtained container.

The multilayer parison obtained in this manner has preferably a total thickness of 2 to 5 mm, and a summed-up thickness of EVOH layers of 10 to 500 µm. The obtained multilayer parison is transferred to a stretch blow step directly at a high temperature or after re-heating with a heating element such as a block heater, an infrared heater, etc. The heated multilayer parison is stretched 1 to 5 times in the machine direction in the stretch blow step and then stretch blow molded 1 to 4 times by compressed air or the like, whereby the multilayer injection blow molded container of the invention can be produced. In the production, the temperature of the multilayer parison is preferably 130 to 180° C., and more preferably 135 to 170° C., from the viewpoint of molding properties.

The total thickness of the container body of the multilayer injection blow molded container according to the invention is generally 0.1 to 3 mm, and varies depending on the use. In addition, the summed-up thickness of EVOH layers is preferably within a range of 2 to 200 µm, and more preferably 5 to 100 µm.

Since the multilayer injection blow molded container of the invention obtained in the above manner has a multilayer constitution comprising the layer of EVOH (A) and the layer of the resin composition (B), it has all of the mechanical strength of the layer of the resin composition (B) such as the interlayer adhesion strength toward the layer of EVOH (A), as well as the gas-barrier properties, the scent-retaining property, the organic solvent resistance and the like, which the layer of EVOH (A) possesses. This container is suitable for storing various contents for a long time, and is useful as a container for storing various drinks including customarily hot-filled red tea, foods, cosmetics, blood samples and the like. Specific examples of the container include, but are not limited to, bottles, cups, tubes, trays and the like. Among them, bottles are suitable.

EXAMPLES

The invention will now be described in more detail with reference to the following Examples, but these Examples should not be construed as a limitation upon the invention.

Synthesis Example 1

Synthesis of SEBS Having a Boronic Acid Ester Group

Into a twin-screw extruder was fed a styrene-hydrogenated butadiene-styrene block copolymer (SEBS, styrene/hydrogenated butadiene =18/82 (weight ratio), degree of hydrogenation of butadiene unit: 97%, amount of double bond: 430 µeq/g, melt index: 5 g/10 min. (230° C., load: 2,160 g)) at a rate of 7 kg/hour while replacing an inlet with nitrogen at a rate of 1 liter/min. Then, a mixed solution of a borane-triethylamine complex (TEAB) and boric acid 1,3-butanediol ester (BBD) was fed (TEAB/BBD=29/71 in weight ratio) from a liquid feeder 1 at a rate of 0.6 kg/hour, and 1,3-butanediol was fed from a liquid feeder 2 at a rate of 0.4 kg/hour; they were continuously kneaded. During kneading, the pressure was controlled such that the gauge pressures at a vent 1 and a vent 2 indicated about 20 mmHg. As the result, SEBS (X-1) having a boronic acid 1,3-butanediol ester group (BBDE) was obtained from an outlet at a rate of 7 kg/hour. This SEBS had an amount of the boronic acid 1,3-butanediol ester group of 210 µeq/g, an amount of double bond of 150 µeq/g and a melt index of 5 g/10 min. (230° C., load: 2,160 g).

The constitution and operating conditions of the twin-screw extruder used for the reaction were as follows:

Parallel twin-screw extruder TEM-35B (manufactured by Toshiba Machine Co., Ltd.)

Screw diameter: 37 mmφ

L/D: 52 (15 blocks)

Liquid feeders: C3 (liquid feeder 1) and C11 (liquid feeder 2)

Vent positions: C6 (vent 1) and C14 (vent 2)

Constitution of screws: seal rings at positions between C5 and C6, between C10 and C11, and at C12

Temperature setting:

| | |
|---|---|
| C1 | water cooling |
| C2 to C3 | 200° C. |
| C4 to C15 | 250° C. |
| Die | 250° C. |

Revolution rate of screw: 400 rpm

Synthesis Example 2

Synthesis of EPDM Having a Boronic Acid Ester Group

Into a twin-screw extruder was fed an ethylene-propylene-ethylidenenorbornene copolymer (EPDM, amount of double bond: 390 μeq/g, melt index: 4 g/10 min. (190° C., load: 2,160 g)) at a rate of 7 kg/hour while replacing an inlet with nitrogen at a rate of 1 liter/min. Then, a mixed solution of a borane-triethylamine complex (TEAB) and boric acid 1,3-butanediol ester (BBD) was fed (TEAB/ BBD=29/71 in weight ratio) from a liquid feeder 1 at a rate of 0.8 kg/hour, and propylene glycol was fed from a liquid feeder 2 at a rate of 0.4 kg/hour; they were continuously kneaded. During kneading, the pressure was controlled such that the gauge pressures at a vent 1 and a vent 2 indicated about 20 mmHg. As the result, EPDM (X-2) having a boronic acid 1,3-butanediol ester group (BBDE) and a boronic acid propylene glycol ester group (BPGE) was obtained from an outlet at a rate of 7 kg/hour. This EPDM had an amount of the boronic acid 1,3-butanediol ester group of 180 μeq/g, an amount of the boronic acid propylene glycol ester group of 150 μeq/g, no double bond and a melt index of 4 g/10 min. (190° C., load: 2,160 g).

Synthesis Example 3

Synthesis of SEPS Having a Boronic Acid Ester Group

Into a twin-screw extruder was fed a styrene-hydrogenated isoprene-styrene block copolymer (SEPS, styrene/hydrogenated isoprene=16/84 (weight ratio), degree of hydrogenation of isoprene unit: 92%, amount of double bond: 930 μeq/g, melt index: 2 g/10 min. (230° C., load: 2,160 g)) at a rate of 6 kg/hour while replacing an inlet with nitrogen at a rate of 1 liter/min. Then, a mixed solution of a borane-triethylamine complex (TEAB) and boric acid 1,3-butanediol ester (BBD) was fed (TEAB/BBD=29/71 in weight ratio) from a liquid feeder 1 at a rate of 1.2 kg/hour, and 1,3-butanediol was fed from a liquid feeder 2 at a rate of 0.6 kg/hour; they were continuously kneaded. During kneading, the pressure was controlled such that the gauge pressures at a vent 1 and a vent 2 indicated about 20 mmHg. As the result, SEPS (X-3) having a boronic acid 1,3-butanediol ester group (BBDE) was obtained from an outlet at a rate of 6 kg/hour. This SEPS had an amount of the boronic acid 1,3-butanediol ester group of 520 μeq/g, an amount of double bond of 380 μeq/g and a melt index of 2 g/10 min. (230° C., load: 2,160 g).

Example 1

Into a twin-screw type vent extruder were charged 80 parts by weight of polypropylene (B-1, melt index: 8.8 g/10 min. (230° C., load: 2,160 g)) and 20 parts by weight of SEBS (X-1) obtained in Synthesis Example 1; they were extruded for pelletization at 220° C. in the presence of nitrogen to give pellets of a resin composition.

A two-kind/three-layer parison of the type: resin composition/EVOH/resin composition was molded from the obtained pellets of resin composition and EVOH (A-1) having a constitution and physical properties shown in Table 1 as raw materials using a co-injection molding machine manufactured by Kortec/Husky (model: SL 160, 4-pieces type). In this production, the temperature in the injection machine at the resin composition side was 220° C., the temperature in the injection machine at the EVOH side was 200° C., the temperature in a hot runner block part at which the resin composition and EVOH were combined was 220° C., the core temperature of the injection mold was 10° C., and the cavity temperature of the injection mold was 10° C.

Thereafter, stretch blow molding was carried out by heating the parison to 170° C. at a surface temperature using a stretch blow molding machine manufactured by Crupp Corpoplast Machinenbau, to give two-kind/three-layer type multilayer injection blow molded bottles having a thickness for the resin composition at the inner layer of 120 μm, that for EVOH at the intermediate layer of 20 μm and that for the resin composition at the outer layer of 150 μm, in average thickness of the body. A method for quantitatively analyzing alkali metal salts contained in the used EVOH and methods for evaluating the obtained multilayer injection blow molded bottles are described below:

(1) Quantitative Analysis of Alkali Metal Salts in EVOH:

Into 50 ml of a 0.01 N aqueous hydrochloric acid solution were added 10 g of dried chips as a sample, and the mixture was stirred at 95° C. for 6 hours. The aqueous solution after stirring was quantitatively analyzed by ion chromatography to quantify the amount of alkali metal ions. The used column was ICS-C25 manufactured by Yokogawa Electric Corporation, and the eluent was an aqueous solution containing 5.0 mM tartaric acid and 1.0 mM 2,6-pyridinedicarboxylic acid. In the quantification, a calibration curve prepared with each alkali metal chloride as a standard. From the amounts of the alkali metal ions obtained in this manner, the amounts of alkali metal salts in the dried chips were calculated as amounts converted to metal elements.

(2) Generation Rate of delamination in Multilayer Container:

Water was filled in the bottle as the content; after tightly stoppering under atmospheric pressure, the bottle was subjected to gravity-drop only once onto a 20 cm-triangular receiver having an angle of 90° from a height of 50 cm under the condition that the bottle body was kept horizontal so that the corner of the receiver stroke the center of the bottle body. A hundred bottles were tested for one kind of bottle, and the generation rate of delamination, Rd (%) was calculated from the number Nd of bottles having caused delamination according to the following equation:

$$Rd=(Nd/100)\times 100$$

(3) Evaluation of outer appearance of Parison:

In order to evaluate the thermal stability of the resin as the raw material, the production of bottles was carried out continuously for 7 days, and the obtained parisons were observed for any existence of hard spot, gel, streak, etc.

Example 2

The pelletization was carried out in the same manner as in Example 1, except that EPDM (X-2) obtained in Synthesis Example 2 was used in place of SEBS (X-1) in Example 1, to give pellets of a resin composition.

From the obtained pellets of the resin composition and EVOH (A-1) used in Example 1 as raw materials, two-kind/three-layer type multilayer injection blow molded bottles were produced and evaluated in the same manner as in Example 1.

Example 3

Into a twin-screw type vent extruder were charged 80 parts by weight of polypropylene (B-2, melt index: 0.9 g/10 min. (230° C., load: 2,160 g)) and 20 parts by weight of SEBS (X-3) obtained in Synthesis Example 3; they were extruded for pelletization at 220° C. in the presence of nitrogen to give pellets of a resin composition.

From the obtained pellets of the resin composition and EVOH (A-1) as raw materials, two-kind/three-layer type multilayer injection blow molded bottles were produced and evaluated in the same manner as in Example 1.

Example 4

Two-kind/three-layer type multilayer injection blow molded bottles were produced and evaluated in the same manner as in Example 1, except that EVOH (A-2) having a constitution and physical properties shown in Table 1 was used in place of EVOH (A-1) in Example 1.

Comparative Example 1

Two-kind/three-layer type multilayer injection blow molded bottles were produced and evaluated in the same manner as in Example 1, except that polypropylene (B-1) was used in place of the pellets of the resin composition in Example 1.

Comparative Example 2

The pelletization was carried out in the same manner as in Example 1, except that maleic anhydride (MAn)-modified polypropylene (Y-1, "Admer QF 551" manufactured by Mitsui Chemical, melt index: 5.7 g/10 min. (230° C., load: 2,160 g)) was used in place of SEBS (X-1) in Example 1, to give pellets of a resin composition.

From the obtained pellets of the resin composition and EVOH (A-1) used in Example 1 as raw materials, two-kind/three-layer type multilayer injection blow molded bottles were produced and evaluated in the same manner as in Example 1.

Comparative Example 3

Two-kind/three-layer type multilayer injection blow molded bottles were produced and evaluated in the same manner as in Comparative Example 2, except that EVOH (A-2) was used in place of EVOH (A-1) in Comparative Example 2.

The EVOH and resin components used in the resin compositions for the multilayer injection blow molded containers in the Examples of the invention and the Comparative Examples are shown in the following Table 1, Table 2 and Table 3.

TABLE 1

Composition and physical properties of EVOH

| EVOH | Ethylene content, mol % | Degree of saponification, % | Alkali metal salt content[1], ppm | Melt index[2], g/10 min. |
|---|---|---|---|---|
| A-1 | 32 | 99.5 | 20 | 1.6 |
| A-2 | 32 | 99.5 | 300 | 1.6 |

[1] a value converted to an alkali metal element
[2] a value at 190° C. under a load of 2,160 g

TABLE 2

Physical properties of polypropylene (PP)

| PP | Melt index[3], g/10 min. |
|---|---|
| B-1 | 8.8 |
| B-2 | 0.9 |

[3] a value at 230° C. under a load of 2,160 g

TABLE 3

Composition and physical properties of modified resin (b1)

| b1 | Base polymer | Functional group | Melt index, g/10 min. |
|---|---|---|---|
| X-1 | SEBS | BBDE | 5[4] |
| X-2 | EPDM | BBDE, BPGE | 4[5] |
| X-3 | SEPS | BBDE | 2[4] |
| Y-1 | PP | MAn | 5.7[4] |

[4] a value at 230° C. under a load of 2,160 g
[5] a value at 190° C. under a load of 2,160 g The layer constitution and the results of evaluation of the bottles are summarized in Table 4.

TABLE 4

Layer constitution and results of evaluation

| | Layer A EVOH | Layer B Modified resin (b1) | Layer B PP (b2) | Layer B Weight ratio (b1/b2) | Layer constitution | Generation rate of delamination | Outer appearance of parsion[6] |
|---|---|---|---|---|---|---|---|
| Example 1 | A-1 | X-1 | B-1 | 20/80 | B/A/B | 0 | A |
| Example 2 | A-1 | X-2 | B-1 | 20/80 | B/A/B | 0 | A |
| Example 3 | A-1 | X-3 | B-2 | 20/80 | B/A/B | 0 | A |
| Example 4 | A-2 | X-1 | B-1 | 20/80 | B/A/B | 0 | B |
| Comparative Example 1 | A-1 | — | B-1 | — | B/A/B | 90 | A |
| Comparative Example 2 | A-1 | Y-1 | B-1 | 20/80 | B/A/B | 20 | A |
| Comparative Example 3 | A-2 | Y-1 | B-1 | 20/80 | B/A/B | 20 | B |

[6] A: Hard spots and streaks were not generated.
B: Streaks were generated.

What is claimed is:
1. A multilayer injection blow molded container comprising a layer which comprises an ethylene-vinyl alcohol copolymer (A) having an ethylene content of 5 to 60% by mol and a degree of saponification of 85% or more and a layer which comprises a resin composition (B), characterized in that said resin composition (B) comprises 1 to 40% by weight of a thermoplastic resin (b1) having at least one functional group elected from the group consisting of boron-containing groups that are convertible to a boronic acid group in the presence of water and a boronic acid group, and 60 to 99 by weight of polypropylene (b2).

2. The multilayer injection blow molded container according to claim 1, wherein the ethylene-vinyl alcohol copolymer (A) has an ethylene content of 25 to 50% by mol and a degree of saponification of 99% or more.

3. The multilayer injection blow molded container according to claim 1, wherein the ethylene-vinyl alcohol copolymer (A) has an alkali metal salt content, converted to an alkali metal element, of 100 ppm or less.

4. The multilayer injection blow molded container according to claim 1, wherein the ethylene-vinyl alcohol copolymer (A) has an ethylene content of 25 to 50% by mol, a degree of saponification of 99% or more and an alkali metal salt content, converted to an alkali metal element, of 100 ppm or less.

5. The multilayer injection blow molded container according to claim 1, wherein the thermoplastic resin (b1) is at least one resin selected from the group consisting of polyolefin resins and styrene-hydrogenated diene block copolymer resins.

6. The multilayer injection blow molded container according to claim 1, wherein at least one functional group selected from the group consisting of boron-containing groups that are convertible to a boronic acid group in the presence of water and a boronic acid group is a boronic acid cyclic ester group.

7. The multilayer injection blow molded container according to claim 1, wherein the thermoplastic resin (b1) having at least one functional group selected from the group consisting of boron-containing groups that are convertible to a boronic acid group in the presence of water and a boronic acid group is at least one resin selected from the group consisting of polyolefin resins and styrene-hydrogenated diene block copolymer resins having a boronic acid cyclic ester group.

8. A multilayer injection blow molded container comprising a layer which comprises an ethylene-vinyl alcohol copolymer (A) having an ethylene content of 25 to 50% by mol, a degree of saponification of 99% or more and an alkali metal salt content, converted to an alkali metal element, of 100 ppm or less and a layer which comprises a resin composition (B), characterized in that said resin composition (B) comprises 1 to 40% by weight of at least one resin (b1) selected from the group consisting of polyolefin resins and styrene-hydrogenated diene block copolymer resins having a boronic acid cyclic ester group, and 60 to 99% by weight of polypropylene (b2).

9. The multilayer injection blow molded container according to claim 1, comprising exclusively the layer of the ethylene-vinyl alcohol copolymer (A) and the layer of the resin composition (B).

10. The multilayer injection blow molded container according to claim 1, having the layers of the resin composition (B) on both sides of the layer of the ethylene-vinyl alcohol copolymer (A).

11. The multilayer injection blow molded container according to claim 1, comprising exclusively the layer of the ethylene-vinyl alcohol copolymer (A) and the layer of the resin composition (B), and having the layers of (B) on both sides of the layer of (A).

12. The multilayer injection blow molded container according to claim 8, comprising exclusively the layer of the ethylene-vinyl alcohol copolymer (A) and the layer of the resin composition (B).

13. The multilayer injection blow molded container according to claim 8, having the layers of the resin composition (B) on both sides of the layer of the ethylene-vinyl alcohol copolymer (A).

14. The multilayer injection blow molded container according to claim 8, comprising exclusively the layer of the ethylene-vinyl alcohol copolymer (A) and the layer of the resin composition (B), and having the layers of (B) on both sides of the layer of (A).

15. The multilayer injection blow molded container according to claim 8, which is a bottle.

16. A multilayer injection blow molded bottle comprising exclusively a layer which comprises an ethylene-vinyl alcohol copolymer (A) having a ethylene content of 25 to 50% by mol, a degree of saponification of 99% or more and an alkali metal salt content, converted to an alkali metal element, of 100 ppm or less and a layer which comprise a resin composition (B), and having layers of (B) on both sides of the layer of (A), characterized in that said resin composition (B) comprises 1 to 40% by weight of at least one resin (b1) selected from the group consisting of polyolefin resins and styrene-hydrogenated diene block copolymer resins having a boronic acid cyclic ester group, and 60 to 99% by weight of polypropylene (b2).

17. A process for producing a multilayer injection blow molded container, characterized by multilayer injection molding an ethylene-vinyl alcohol copolymer (A) having an ethylene content of 5 to 60% by mol and a degree of saponification of 85% or more and a resin composition (B) comprising 1 to 40% by weight of a thermoplastic resin (b1) having at least one functional group selected from the group consisting of boron-containing groups that are convertible to a boronic acid group in the presence of water and a boronic acid group and 60 to 99% by weight of polypropylene (b2), and subsequently stretch blow molding them.

18. The process for producing a multilayer injection blow molded container according to claim 17, including a step of multilayer injection flow molding by a single mold closing operation using a molding machine having a plurality of injection cylinders.

* * * * *